US005091685A

United States Patent [19]

Sorensen et al.

[11] Patent Number: 5,091,685

[45] Date of Patent: Feb. 25, 1992

[54] METHOD AND APPARATUS FOR CONTROLLING THE SHUTTLE OF A STORAGE AND RETRIEVAL MACHINE

[75] Inventors: B. Chuck Sorensen, Salt Lake City, Utah; Craig A. Devroy, Wauwatosa, Wis.

[73] Assignee: Harnischfeger Engineers, Inc., Brookfield, Wis.

[21] Appl. No.: 423,907

[22] Filed: Oct. 19, 1989

[51] Int. Cl.$^5$ .............................................. H02P 5/06

[52] U.S. Cl. .................................... 318/652; 318/648; 318/671; 414/273; 414/281; 187/9 E; 187/9 R

[58] Field of Search .................. 318/16, 38, 139, 257, 318/258, 274, 368, 434, 648, 652, 587, 671; 187/12, 17, 18, 9 E, 9 R, 8.5, 8.41, 148; 182/2, 141, 63, 148; 414/231, 232, 273, 266, 277, 276, 278, 279, 280, 281, 282, 283, 390, 398, 391, 401, 544, 547, 556, 546, 631, 664, 661, 662, 666, 663, 665, 633, 674; 212/184, 189, 160, 232; 198/614, 855, 804, 841, 588, 750; 340/901, 539, 904, 685; 364/478; 254/122, 386

[56] References Cited

U.S. PATENT DOCUMENTS

| | | | |
|---|---|---|---|
| 3,708,077 | 1/1973 | Richens et al. | 414/279 |
| 3,866,767 | 2/1975 | Zollinger et al. | 414/279 |
| 3,978,995 | 4/1976 | Zollinger et al. | 414/279 |
| 4,265,337 | 5/1981 | Dammeyer | 187/9 E |
| 4,280,205 | 7/1981 | Dammeyer | 187/9 E X |
| 4,331,418 | 5/1982 | Klebe | 414/277 |
| 4,564,085 | 1/1986 | Melocik et al. | 187/9 R |
| 4,691,805 | 9/1987 | Kishi | 187/9 R |
| 4,740,712 | 4/1988 | Michaud | 307/149 |
| 4,835,692 | 5/1989 | Pudney et al. | 180/169 X |

*Primary Examiner*—Paul Ip
*Attorney, Agent, or Firm*—Richard C. Ruppin

[57] ABSTRACT

A shuttle control for a storage and retrieval machine has a supervisory control mounted on the base of the storage and retrieval machine and a shuttle control mounted on the carriage of the storage and retrieval machine. The supervisory control receives shuttle operating commands and information signals and provides operating instruction signals for the shuttle to the shuttle control. The shuttle control receives the operating instruction signals from the supervisory control, produces operating information signals to the supervisory control, and controls the operation of a shuttle motor drive. A circuit having sliding contactors moving with the carriage on vertical slide bars mounted on the mast transmits operating instruction signals and information signals between the supervisory control and the shuttle control at a maximum transmission rate limited by the problems of transmitting the signals through the sliding contactors. Sensors mounted on the carriage of the storage and retrieval machine produce shuttle operating condition indicating signals to the shuttle control at a transmission rate faster that the maximum transmission rate of the circuit. The indicating signals are used by the shuttle control to control the operation of the shuttle motor.

7 Claims, 4 Drawing Sheets

METHOD AND APPARATUS FOR CONTROLLING THE SHUTTLE OF A STORAGE AND RETRIEVAL MACHINE

FIELD OF THE INVENTION

This invention relates generally to the control of a shuttle for a storage and retrieval machine and in particular to a shuttle control which is highly durable and provides rapid, accurate control of the shuttle movement.

BACKGROUND OF THE INVENTION

Storage and retrieval machines typically travel along an aisle between adjacent storage rack structures and have a base on which is mounted a mast supporting a lift carriage which is movable in vertical directions along the mast. A shuttle is mounted on the carriage and the carriage and shuttle together carry a load object to be stored in or retrieved from a rack of the storage structure. The shuttle includes telescoping plate members which are extendible into or retractable from a rack to deliver or retrieve the load object from the storage rack. The telescoping plate members are driven by a motor during their extending and retracting movement and a brake is provided to hold the plates in a fixed location when they are not moving. Various condition sensors are also provided including a velocity feedback sensor mounted on the motor, a sensor to indicate the presence of a load, a sensor to indicate whether the load is skewed, and a sensor to indicate whether a rack into which a load is to be deposited is already full.

The motor, brake and condition sensing devices all require electrical energy to operate either in the form of power for the motor and brake or in the form of electrical control signals. For supplying the power and transmitting the signals, storage and retrieval machines use individual wires, possibly as many as 40 wires, which connect the shuttle devices mounted on the carriage to the shuttle control typically mounted on the base of the storage and retrieval machine. Very flexible wires are used due to the continual flexing and bending of the wires as the carriage is raised and lowered on the mast.

The use of wires to connect the shuttle electrical power and condition sensing devices on the movable carriage with the shuttle control on the base of the storage and retrieval machines presents several different problems. These include frequent wire breakage due to continuous cable flexing thereby requiring a high level of maintenance. High acceleration and deceleration rates of the carriage and thereby rapid operation of the storage and retrieval machine are not possible, also due to frequent wire breakage. Also, the hanging wires catch on the storage rack structures and stored load objects as the storage and retrieval machine runs along the aisle and the carriage moves vertically on the mast. Finally, the carriage is typically shipped separately from the rest of the storage and retrieval machine. Thus, in the assembly of the carriage with the other parts of the machine there is a substantial amount of labor in the field in connecting the wires between the shuttle and the control on the base of the storage and retrieval machine.

SUMMARY OF THE INVENTION

It is an object of this invention to provide a control for the shuttle of a storage and retrieval machine which permits rapid, accurate control of the machine and requires low maintenance. It is a further object of the invention to provide a shuttle control for a storage and retrieval machine having those components between which control signals need to be most rapidly transmitted mounted on the carriage of the machine, and those components between which control signals may be transmitted at a lower rate mounted on the base of the machine.

The invention is carried out by providing a storage and retrieval machine with a shuttle control comprising supervisory control means mounted on the base of the storage and retrieval machine and receiving shuttle operating commands and information signals for providing operating instruction signals for the shuttle, shuttle control means mounted on the carriage and receiving the operating instruction signals of the supervisory control means and producing shuttle operating information signals to the supervisory control means for controlling the operation of a shuttle motor drive, circuit means having a maximum transmission rate for transmitting the operating instruction signals and information signals between the supervisory control means and the shuttle control means, and sensing means supported on the carriage for producing indicating signals to the shuttle control means indicative of predetermined shuttle operating conditions at a transmission rate faster than the maximum transmission rate of the circuit means for use by the shuttle control means in controlling the operation of the motor.

The circuit means for transmitting operating instruction signals and information signals between the supervisory control means on the base and the shuttle control means on the carriage may include vertical slide bar means mounted on the mast and slide means mounted on and movable with the carriage. The slide bar means and slide means continuously engage each other to conduct the operating instruction signals and shuttle information signals. The sensing means may include additional circuit means having stationary electrical connectors between the shuttle control means and the sensing means on the carriage for conducting the indicating signals from the sensing means to the shuttle control means.

In the method of the invention, instruction signals directing the shuttle motor to extend and retract the shuttle are transmitted from a first control on the base of the storage and retrieval machine to a second control on the carriage. Motor control signals are transmitted to the shuttle motor from the second control on the carriage to control operation of the motor in carrying out the instruction signals to the second control from the first control.

DETAILED DESCRIPTION OF THE PREFERRED EMBODIMENT

Figure 1:
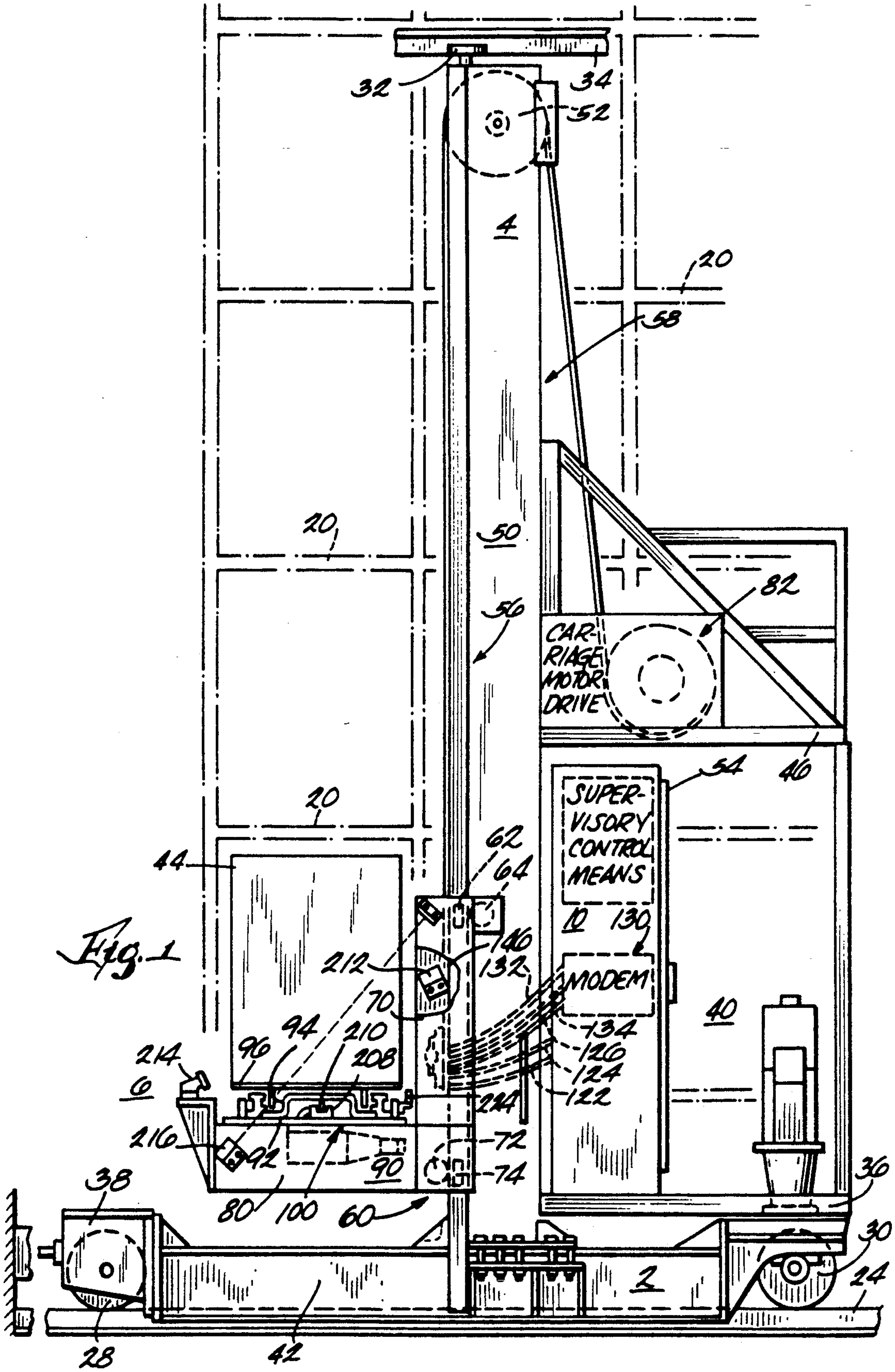
FIG. 1 is a side elevation view of a storage and retrieval machine utilizing the present invention.
Figure 2:
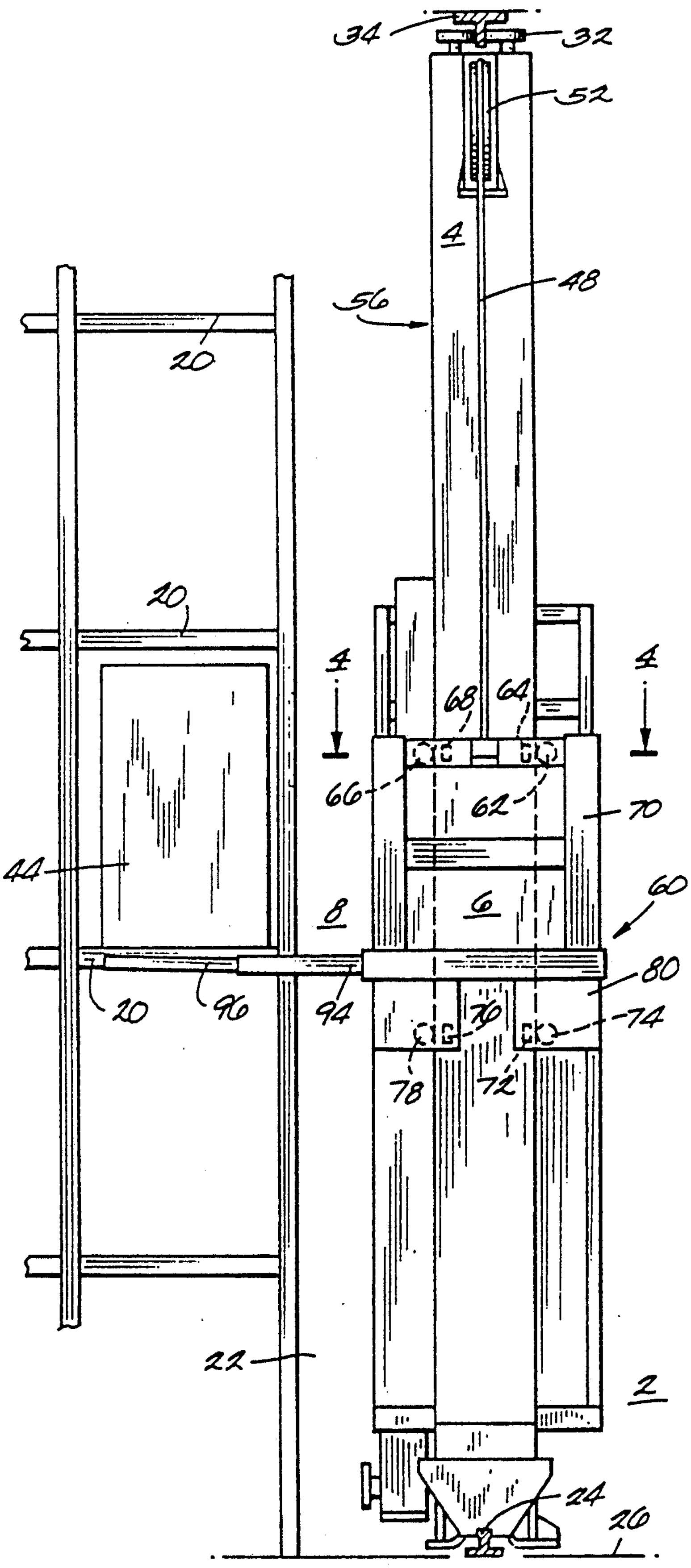
FIG. 2 is a front elevation view of the storage and retrieval machine shown in FIG. 1.

Referring generally to FIGS. 1-5 of the drawings, a storage and retrieval machine, which is also referred to herein as an SRM, is shown as having a base 2, a mast 4 mounted on and extending upwardly from the base 2, a carriage 6 movable on a vertical path along the length of the mast 4 to selected vertical positions, a shuttle 8 mounted on the carriage 6, supervisory control means 10, and base, carriage and shuttle controls 12, 14 and 16. A front wheel 28 and a rear wheel 30 are mounted on the base 2 and roll along a rail 24 supported on a foundation 26 and running through an aisle path 22 in a storage area such as a warehouse having stacked storage racks 20. Upper guide wheels 32 on the mast 4 engage a guide rail 34 to guide the SRM along the rails 24 and 34 and maintain the machine in an upright position. A base motor drive 40 mounted on the base 2 drives the rear wheel 30 so that the base 2 and thereby the SRM travels along the rail 24 to selected locations in the aisle path 22 adjacent to the stacked storage racks 20. At each aisle location of the SRM the carriage 6 is driven in vertical directions to a selected one of the storage racks 20 where the shuttle 8 is driven generally horizontally and in directions transverse to the aisle path 22 into a storage rack to deliver or retrieve a load object such as box 44 carried on the shuttle as shown in FIGS. 1 and 2. The carriage 6 is drive by a carriage motor drive 50 acting through a rope drum assembly 82, both mounted on the frame 46 affixed to the base 2 and the mast 4, and driving a rope 48 connected to the carriage 6 and sheave 52. A cabinet 54 is also mounted on the base 2 for enclosing the supervisory control means 10 and a portion of the components of the base, carriage and shuttle controls 12, 14 and 16. A suitable A.C. source (not shown) is provided for supplying electrical power to the SRM for the motor drives and controls of the SRM.

The base 2 comprises an elongated beam 42 disposed parallel to the rail 24 and end trucks 36 and 38 affixed to opposite ends of the beam 42. The wheels 28 and 30 are respectively mounted on the trucks 38 and 36. The mast 4 comprises an elongated tube 56 and an additional elongated member 58 affixed along its length to the tube 56. The carriage 6 includes a frame 60 upon which the shuttle 8 is mounted and to which is connected the rope 48 for moving the carriage 6 vertically along the mast 4 in response to the operation of the motor drive 50 and rope drum assembly 82. The carriage 6 is movably supported and guided on the mast 4 by means of upper support rollers 62, 64, and 66, 68 rotatably mounted on an upper section 70 of the frame 60, and by means of lower support rollers 72, 74 and 76, 78 rotatably on a lower section 80 of the frame 60.

The shuttle 8 comprises a lower base plate 92 mounted on the lower frame section 80 of the carriage frame 60, an intermediate plate 94, a top plate 96, and a shuttle telescoping drive 100. A shuttle motor drive 90 operates the shuttle telescoping drive 100 to cause the plates 94 and 96 to extend in a telescoping fashion to the position shown in FIG. 2 and retract to a centered position on the lower frame section 80 relative to the view of FIG. 2. The shuttle 8 thus operates in conjunction with the base 2 and carriage 6 to deposit in or retract from a storage rack 20, a load object 44.

Figure 5:
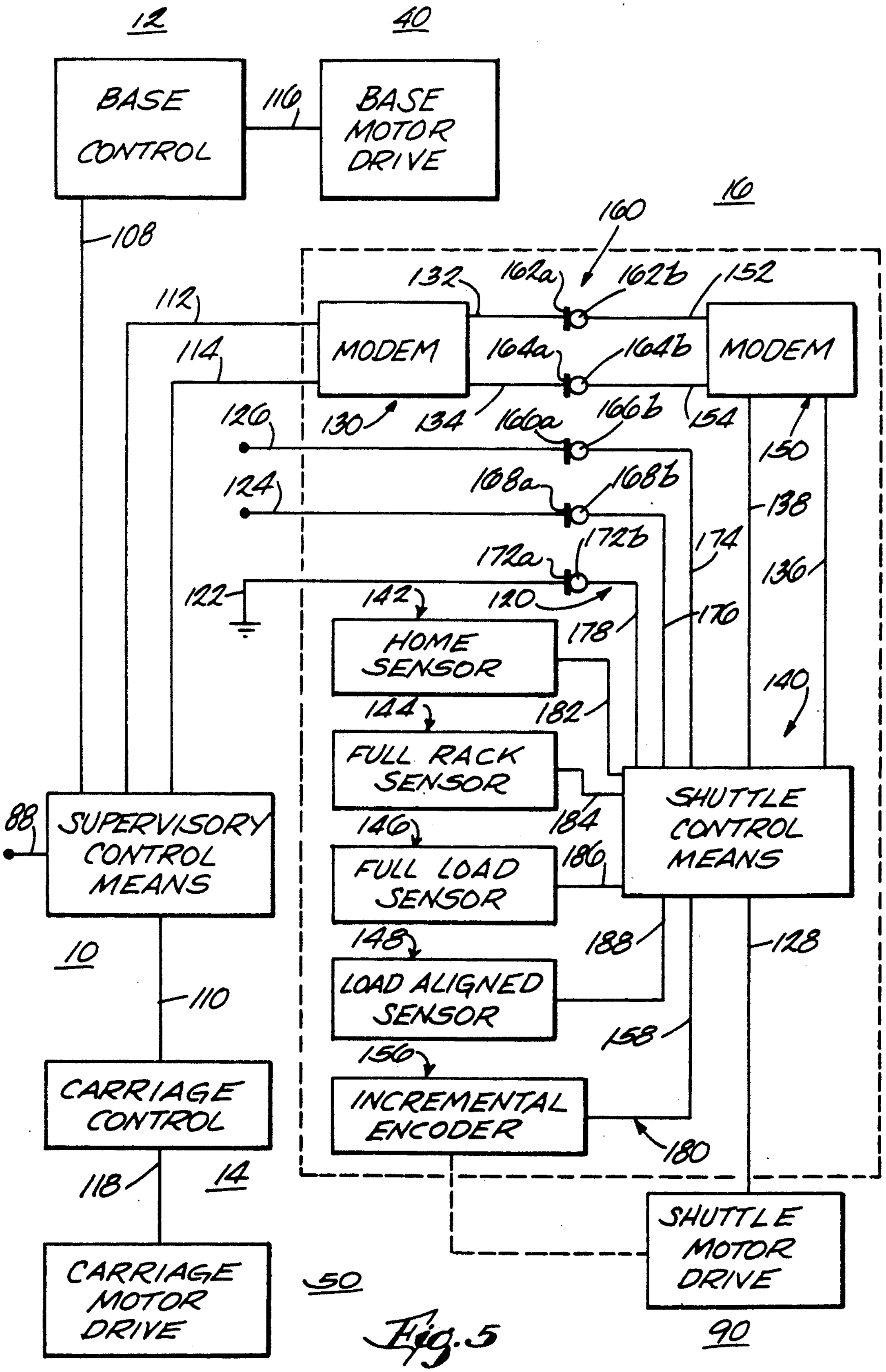
FIG. 5 is a schematic circuit diagram illustrating the control according to the instant invention.

With reference to FIG. 5, a control system for the SRM is illustrated and includes a supervisory control means 10 which receives operating command information on line 88 from a remote source (not shown), the base control 12 for controlling the movement of the base 2 of the SRM along the aisle path 22, the carriage control 14 for controlling the vertical movement of the carriage 6 along the mast 4, and the shuttle control 16 for controlling the extending and retracting movement of the shuttle 8 into and out of a storage rack 20. The various components of the control system are connected to each other, to motor drives and to power sources by electrical conductors which may, for example, be in the form of wires and associated wire terminals. In the description herein, connecting lines and wires are identified and each identified line or wire represents one or more wires appropriate for the operation of the connected components. The supervisory control means 10 has a connection to the base control 12 and carriage control means 14 respectively represented by lines 108 and 110, and connections to the shuttle control 16 represented by lines 112 and 114. The base control 12 is connected by a line 116 to the base motor drive 40. The carriage control means 14 is connected by a representative line 118 to the carriage motor drive 50.

The shuttle control 16 includes a signal and power transmission circuit 120 having a modem 130 mounted on the base 2, a modem 150 mounted on the carriage 6, and an electrical slide connector 160 including slide bars ***162a*, *164a*, *166a*, and *168c* and *172a* vertically mounted on the mast 4 and corresponding slide brush assemblies *162b*, *164b*, *166b*, *168b* and *172b* mounted on the carriage in resilient slidable engagement with the corresponding slide bars. Thus, as the carriage moves in vertical directions on the mast 4, the slide brush assemblies move along the corresponding slide bars in a continuous, maintained engagement manner. The modem 130 is connected by line 132 to the slide bar *162a* and by line 134 to the slide bar *164a*. The modem 150 is connected to the slide brush assembly *162b* by a line 152 and to the slide brush assembly *164b* by a line 154. The modems 130 and 150 are thus electrically connected to each other through the engagement of slide bar *162a* and slide brush assembly *162b*, and slide bar *164a* and slide brush assembly *164b*. Lines 126, 124 and 122 are respectively connected to slide bars *166a*, *168a* and *172a* and lines 174, 176 and 178 are respectively connected between slide brush assemblies *166b*, *168b* and *172b* and shuttle control means 140. The use of the circuit 120 having the sliding connector 160 to transmit electrical power and signals between the control 16 on the moving carriage and the base 2 eliminates the need for moving wires and their accompanying problems to provide these functions. The shuttle control 16 also includes the shuttle control means 140, a home sensor 142 connected by line 182 to the shuttle control means 140, a full rack sensor 144 connected by line 184 to the shuttle control means 140, a full load sensor 146 connected by line 186 to the shuttle control means 140, and a load aligned sensor 148 connected by line 188 to the shuttle control means 140. An incremental encoder 156 is mounted on and mechanically connected to the shuttle motor drive 90 and electrically connected by line 158 to the shuttle control means 140**.

Figure 4:
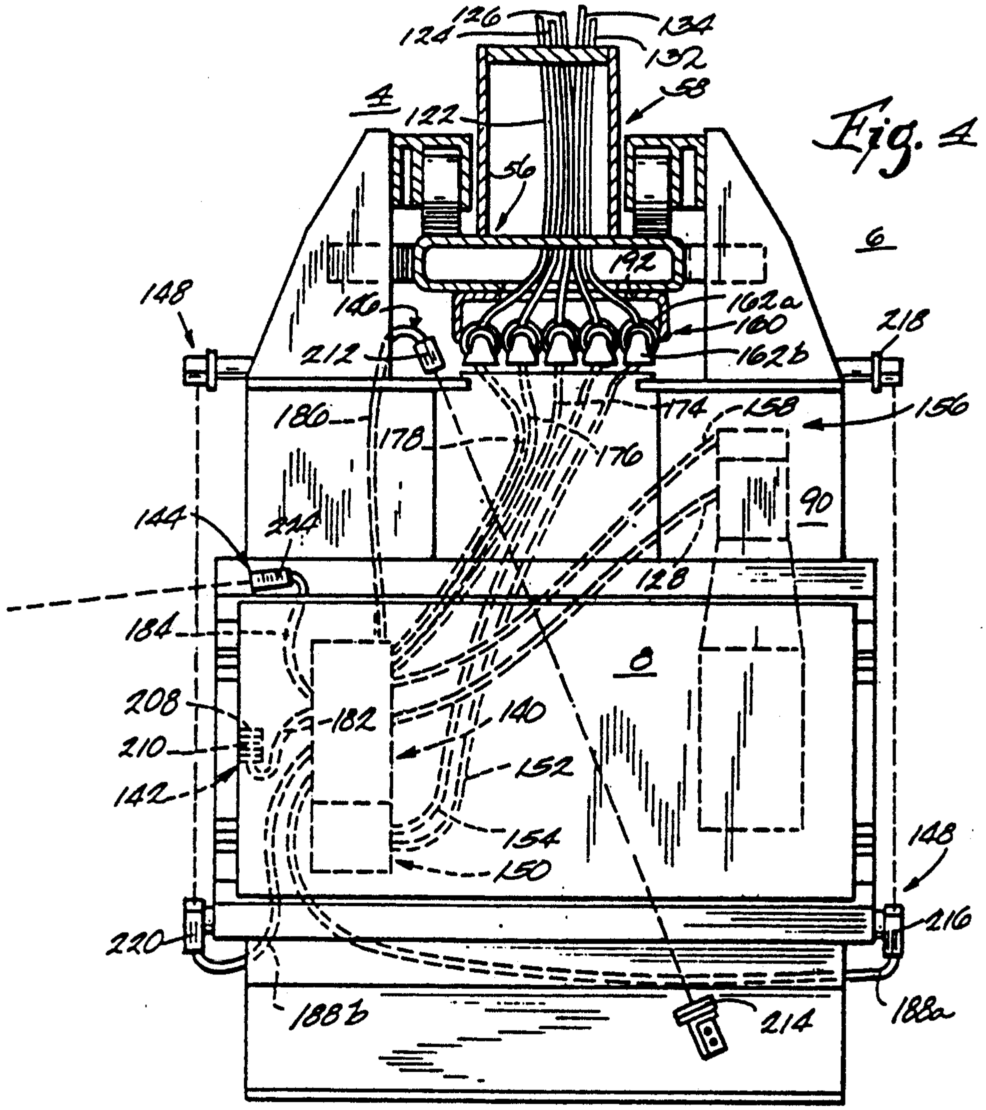
FIG. 4 is a sectional view taken along line 4—4 of FIG. 2.
Figure 3:
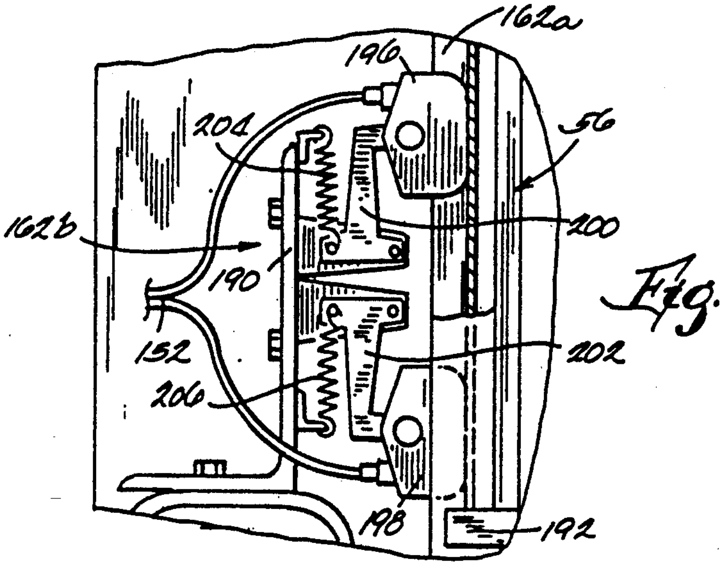
FIG. 3 is an enlarged sectional view, with portion broken away, taken along line 3—3 of FIG. 2.

With reference to FIGS. 3 and 4, the slide bars ***162a*, *164a*, *166a*, *168a* and *172a* are attached in an insulated manner to brackets 192 which are mounted on the mast tube 56. The lines 132 and 134 respectively run from the slide bars *162a* and *164a* to the modem 130 in the control cabinet 54. The lines 122, 124 and 126 respectively extend from the slide bars *172a*, *168a* and *166a* into the cabinet 54. The slide brush assemblies 162***b*, 164*b*, 166*b*, 168*b*, 172*b* are attached to a bracket 190 which is, in turn, mounted on the carriage frame 60. Each slide brush assembly includes a pair of slide brushes 196, 198 engaging the same slide bar, a pair of brush holder arms 200, 202 pivotally attached to the bracket 190 and pivotally attached respectively to a brush 196 and a brush 198, and a pair of springs 204, 206 connected between the bracket 190 and the respective pivotal arms 200 and 202 for maintaining the brushes 196 and 198 in continuous contact with a slide bar. The lines 152, 154, 174, 176, 178, each in the form of a pair of wires connected to the brush pair, respectively extend from brush assemblies 162*b*, 164*b*, 166*b*, 168*b* and 172*b* to modem 150 or shuttle control means 140.

As shown in FIGS. 4 and 5, the lines 182, 184, 186 188, 158 and 128, comprising a circuit 180, extend from their various associated condition sensors including the incremental encoder and from the shuttle drive motor to the shuttle control means 140. As shown in FIGS. 1 and 4, the lines of the circuit 180 are all stationary wires mounted on the carriage 6. This permits a high rate of transmission of the signals on these lines which is faster than the maximum transmission rate of the circuit 120. This is particularly important for those condition indicating signals which need to be transmitted as quickly as possible, i.e., are time sensitive, such as the shuttle home reference signal from the home sensor 142 to the shuttle control means 140 and the signals relating to velocity, acceleration, deceleration and position between the encoder 156 and the shuttle control means 140. The shuttle home reference signal is one of the time sensitive signals since any delay in transmission of this signal will result in the shuttle possibly moving to a different position than the reference position while the reference signal is being transmitted to the shuttle control means 140.

The home sensor 142 comprises a photocell unit 208 mounted on the lower base plate 92 of the shuttle and having spaced apart arms and a finger member 210 mounted on the intermediate plate 94. As the shuttle 8 moves horizontally and the plates 96 and 94 become centered on the carriage in a direction transverse to the movement of the SRM base along its path, the finger 210 moves between the two arms of the photocell unit 208. The shuttle 8 is then considered to be at a home or reference position and a signal is transmitted on the line 182 to the shuttle control means 140. The incremental encoder 156 senses and provides a signal on line 158 indicative of the position of a motor shaft of the shuttle motor drive 90, of the count of the number of turns of the motor shaft, of the velocity of the motor drive, and of the acceleration and deceleration of the motor drive. Thus, the encoder 156 provides a signal indicating the corresponding position, distance moved, linear velocity and acceleration and deceleration of the shuttle 8. Consequently, when the home sensor 142 indicates that the shuttle is at the reference position, the count indication of the incremental encoder 156 will be the reference count for purposes of subsequent positioning of the shuttle.

The full load sensor 146 includes a photocell unit 212 mounted on the upper section 70 of the carriage frame 60 and a reflector 214 mounted on the lower section 80 of the frame 60. As can be seen in FIGS. 1 and 4, the position of the full load sensor 146 is such that when a light beam is transmitted from the photocell unit 212 toward the reflector 214, the light beam will be interrupted when a load object 44 is present on the the shuttle 8. The photocell unit 212 then provides a condition signal to the shuttle control means 140 on line 186 indicating the presence of the load on the shuttle and carriage. The load aligned sensor 148 includes a photocell unit 216 mounted on the lower section 80 of the frame 60 and a reflector 218 mounted on the upper section 70 of the frame 60. A second photocell unit 220 is also mounted on the lower section 80 of the carriage frame 60 and a second reflector 222 is mounted on the upper section 70 of the carriage frame. The photocell units 216 and 220 are respectively connected to the shuttle control means 140 by lines 188 and 188*b* shown in FIG. 4 and which together comprise line 188 in FIG. 5. The photocell units 216 and 220 respectively transmit a light beam toward their associated reflectors 218 and 222 and the light beams are reflected back to the photocell units 216 and 220. The position of the photocell units and reflectors are such that the light beams will travel along the side edges of the carriage 6 while the load remains in alignment with the carriage and an aligned condition signal will be indicated to the shuttle control means 140. If the load object 44 on the shuttle 8 is not in alignment with the carriage frame and extends laterally off of the carriage frame, one of the light beams will be interrupted and a resulting signal from one of the photocell units 216 or 220 indicating lack of alignment of the load will be transmitted to the shuttle control means 140.

The full rack sensor 144 has a photocell unit 224 mounted on the shuttle telescoping drive 100 and transmits a light beam aimed towards a rack 20 when the carriage and shuttle are in a position to retract a load object from the rack. If the rack is empty, the sensitivity of the photocell 224 is such that the light beam will not be reflected and a empty rack condition signal will be transmitted by the photocell unit 224 on line 184 to the shuttle control means 140. If the rack is full, the light beam will be reflected to the photocell unit 224 and a full rack indicating signal will be transmitted to the shuttle control means 140.

The modem 130 receives shuttle operating instruction signals on lines 112 and 114 from the supervisory control means 10 in an RS232C format and converts the RS232C signals to a modulated frequency signal on the lines 132 and 134. The modem 150 receives the modulated frequency signals from the modem 130 that have been conducted through the sliding connector 160 and on lines 152 and 154 and converts the modulated frequency signals back to an RS232C format on the lines 136 and 138 to the shuttle control means 140. The modems 130 and 150 are of a full duplex type and also receive operating information signals from the shuttle control means 140. These operating signals are received at modem 150 in RS232C format, converted to modulated frequency signals, and converted back to RS232C format on lines 112 and 114 at modem 130. The reason for utilizing the modems 130 and 150 is that both the supervisory control means 10 and the shuttle control means 140 can transmit and receive signals in RS232C format, however, signals in RS232C format cannot be reliably transmitted through the moving contacts of the sliding connector 160 due to noise caused by the movement of the brushes whereas signals in a modulated frequency form are not affected by such noise. The control signals such as the instruction and information signals conducted through the circuit 120 are transmitted at a maximum rate controlled by the need to convert the form of the signals at the modems 130 and 150, and the delay in responding to signals at the supervisory control means 10. However, these signals relate to operations and conditions which are the least time critical of the various types of signals e.g., signals relating to instructions or information that need not be acted on immediately such as instructions to move to another location and information as to whether a load is present on the carriage, whether the load is aligned, and whether a rack is full.

The supervisory control means 10 may, for example, comprise a programmable logic controller which is programmed to produce specific operating instructions to the base control 12, carriage control 14 and shuttle control 16 in response to an operating command received in RS232C format on the line 88 from the remote control source. The operating command from the remote source is typically a command to the SRM to pick up or deposit a load object 44 or to move to a specified location. The shuttle control means 140 of the shuttle control 16 also contains a program for operating the shuttle drive motor 90 and producing operating information signals to the control means 10 in response to operating instructions from the control means 10 and in response to condition indicating signals such as those from the full rack sensor 144, full load sensor 146 and load aligned sensor 148. The base control 12 and carriage control 14 will operate and respond in a manner similar to the shuttle control means 140 upon receipt of operating instruction signals from the control means 6. Thus, the supervisory control means 10 will proceed through a sequence of operating steps, dependent on its internal program, and receive commands, responses, and condition information, process the information received, and transmit operating instructions as necessary for the combined operation of the base 2, carriage 6 and shuttle 8 in carrying out the commands received from the remote source.

Upon the receipt by the supervisory control means 10 of a command from the remote source, such as a command to pick up a load object at a first storage rack 20 and deposit it at another storage rack 20, the control means 10 will transmit appropriate operating instructions to the base control 12, carriage control 14, and shuttle control 16. The instruction signals to the base control and carriage control respectively are transmitted on lines 108 and 110 and the instruction signals to the shuttle control 16 and the shuttle control means 140 are transmitted on the lines 112 and 114 through the modems 130, 150 and the slide connector 160. The instruction to the shuttle control 16 directs the shuttle to go to its home position which is a position laterally centered on the carriage 6. Upon the shuttle reaching the home position, the home sensor will produce a reference position indicating signal to the shuttle control means 140. The control means 140 then requests the incremental encoder 156 to indicate the shuttle position, i.e., the count of the encoder. The high rate of transmission between the shuttle control means 140 and the home sensor and incremental encoder is particularly important in locating the home position due to the position error that could occur due to movement of the shuttle between the home position signal and the count signal from the encoder. Also, the shuttle control means 140 directs the shuttle motor drive 90 for reference and other operating purposes to move the shuttle a specified distance at a specified velocity, acceleration and deceleration. High speed operation and accurate control of the shuttle requires the high rate of signal transmission between the shuttle control means 140 and the shuttle motor drive and incremental encoder. Instructions to the carriage control 14 and base control 12 direct the control 14 to move the carriage to its home position after completion of the shuttle movement to the shuttle home position and directs the base control 12 to move the base to the new location on its aisle path at which the pick up storage rack is located. After a response by the carriage control 14 to the supervisory control means 10 indicating that the carriage 6 is at its home position, the control means 10 instructs the carriage control 14 to direct movement of the carriage 6 to move to the carriage's rack pick up position. When the carriage 6 has reached the new pick up position, the control means 14 will respond on line 110 to the control means 10 that the position has been reached. The control means 10 will then transmit an operating instruction through the circuit 120 to the shuttle control means 140 directing the shuttle to extend into the rack. Upon a response back from the shuttle control means through the circuit 120, based on the signal of the incremental encoder 156 to the shuttle control means 140, indicating that the shuttle has travelled the instructed distance, the control means 10 will instruct the carriage control 14 to direct operation of the carriage upward slightly to pick up the load object in the rack. Upon a response from the carriage control 14 that the carriage has moved upward to permit the shuttle to pick up the load object, the control means 10 will transmit an instruction through the circuit 120 to the shuttle control means 140 directing the control means 140 to operate the shuttle motor drive 90 to retract the shuttle from the storage rack with the load it now carried to the shuttle centered position on the carriage 6. When the shuttle control means 140 responds that the instruction has been completed through the circuit 120, the control means 10 instructs the base control and carriage control to move to their deposit locations. Upon receipt from the carriage control and base control that they have reached their deposit positions, the control means 10 directs the shuttle control means 140 to operate the full rack sensor 144 to provide an indication as to whether the rack already contains a load object. If not, the shuttle control means 140 responds through the circuit 120 with the information that the rack is empty. The supervisory control means 10 then instructs the shuttle control means 140 to direct the extension of the rack with the load into the deposit rack. When the shuttle has moved the instructed extension distance, as indicated by the count of the incremental encoder 156 to the shuttle control means 140, the shuttle control means 140 provides an instruction completed response through the circuit 120 to the control means 10. The control means 10 then instructs the carriage control 14 to lower the carriage a small distance to deposit the load object from the shuttle on to the deposit storage rack. Upon an indication of the completion of the lowering of the carriage from the control 14, the control means 10 instructs the shuttle control means 140 to direct the retraction of the unloaded shuttle from the rack to a home, centered position on the carriage as indicated by the incremental encoder 156.

It will be understood that the foregoing description of the present invention is for purposes of illustration only and that the invention is susceptible to a number of modifications or changes none of which entail any departure from the spirit and scope of the present invention as defined in the hereto appended claims.

What is claimed is:

1. In a storage and retrieval machine having a base movable along a horizontal path, a mast mounted on the base, a carriage supported on the mast and movable along a vertical path to and from positions adjacent overhead storage spaces, a shuttle mounted on the carriage including a motor operable to extend the shuttle into and retract the shuttle from the storage spaces along a horizontal path transverse to the base path, a shuttle control comprising:

supervisory control means mounted on the base and receiving operating information signals concerning the shuttle for providing operating instruction signals for the shuttle;

shuttle control means mounted on the carriage, the shuttle control means receiving the operating instruction signals of the supervisory control means and producing operating information signals to the supervisory control means for controlling the operation of the motor;

first circuit means having a maximum transmission rate for transmitting operating instruction signals and operating information signals between the supervisory control means and the shuttle control means; and sensing means supported on the carriage for producing indicating signals to the shuttle control means indicative of predetermined shuttle operating conditions at a transmission rate faster than the maximum transmission rate of the first circuit means for use by the shuttle control means in controlling the operation of the motor to extend and retract the shuttle from the storage spaces.

2. The shuttle control according to claim 1 wherein:

said first circuit means includes vertical slide bar means mounted on the mast and slide means mounted on and movable in said vertical directions with the carriage, the slide means and slide bar means being in continuous engagement with each other and conducting the operating instruction signals and operating information signals between the supervisory control means and the shuttle control means; and the sensing means includes second circuit means having stationary electrical connection means between the operating control means and the sensing means for conducting the indicating signals from the sensing means to the shuttle control means.

3. The shuttle control according to claim 2 wherein said predetermined shuttle operating conditions include the acceleration rate, deceleration rate and velocity of the shuttle motor.

4. In a storage and retrieval machine having a base movable along a horizontal path, a mast mounted on the base, a carriage supported on the mast and movable along a path in vertical directions to and from positions adjacent overhead storage spaces, a shuttle mounted on the carriage including a motor operable to extend the shuttle into and retract the shuttle from the storage spaces along a horizontal path transverse to the base path, the combination comprising:

supervisory control means mounted on the base for producing operating instruction signals for the shuttle and receiving operating information signals concerning the shuttle;

shuttle control means mounted on the carriage, the shuttle control means receiving the operating instruction signals on the supervisory control means and producing the operating information signals for controlling the operation of the motor;

the carriage having an acceleration rate in said vertical directions of at least 2 ft./sec.$^2$; and circuit means electrically connecting the supervisory control means and the shuttle control means for transmitting the operating instruction signals and the operating information signals between the latter two means, the circuit means including vertical slide bar means mounted on the mast and slide means mounted on and movable in said vertical directions at said acceleration rate of at least 2 ft./sec.$^2$ with the carriage in continuous maintained engagement with the slide bar means, the slide means and slide bar means conducting while moving relative to each other at said acceleration rate of at least 2 ft./sec.$^2$ the operating instruction signals and operating information signals during their transmission between the supervisory control means and shuttle control means.

5. The combination according to claim 4 wherein:

the shuttle control means transmits motor control signals to the motor at a minimum transmission rate; and the circuit means has a transmission rate slower that the transmission rate of the shuttle control means.

6. A method for controlling a shuttle of a storage and retrieval machine having a base movable along a horizontal path, a mast mounted on the base, a carriage movable in vertical directions on the mast to and from positions adjacent overhead storage spaces, the shuttle being mounted on the carriage and including a motor operable to extend the shuttle into and retract the shuttle from the storage spaces along a horizontal path transverse to the base path, comprising the steps of:

accelerating the carriage at a rate of at least 2 ft./sec.$^2$;

transmitting instruction signals directing the shuttle motor to extend and retract the shuttle from a first control on the base to a second control on the carriage through a stationary electrical conductor on the mast and a movable electrical conductor on the carriage in engagement with the stationary conductor while the movable conductor is accelerating with the carriage at said rate; and transmitting motor control signals to the shuttle motor from the second control on the carriage to control operating of the motor in carrying out the instruction signals from the first control.

7. The method according to claim 1 further comprising the step of extending and retracting the shuttle at a degree of accuracy determined by the faster second rate of the motor control signals transmitted to the shuttle motor.

* * * * *